(12) United States Patent
Huang et al.

(10) Patent No.: US 11,909,308 B2
(45) Date of Patent: Feb. 20, 2024

(54) POWER CONVERSION CIRCUIT, METHOD FOR CONTROLLING POWER CONVERSION CIRCUIT, AND TRANSFORMER

(71) Applicant: Huawei Digital Power Technologies Co., Ltd., Shenzhen (CN)

(72) Inventors: Zhuyong Huang, Dongguan (CN); Xiaofei Zhang, Dongguan (CN); Peng Shuai, Shenzhen (CN); Peiguo Liu, Dongguan (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 179 days.

(21) Appl. No.: 17/544,690

(22) Filed: Dec. 7, 2021

(65) Prior Publication Data
US 2022/0181964 A1    Jun. 9, 2022

(30) Foreign Application Priority Data
Dec. 8, 2020    (CN) .......................... 202011443619.1

(51) Int. Cl.
H02M 1/36    (2007.01)
H02M 5/10    (2006.01)

(52) U.S. Cl.
CPC ............... *H02M 1/36* (2013.01); *H02M 5/10* (2013.01)

(58) Field of Classification Search
CPC ............ H02M 5/10; H02M 5/12; H02M 5/02; H02M 1/36; H02M 1/38; H02M 1/42; H02M 1/4216; H02M 1/4283
See application file for complete search history.

(56) References Cited

U.S. PATENT DOCUMENTS 7,518,886 B1    4/2009 Lai et al.
2015/0022003 A1*    1/2015 Dighrasker ............. H02J 9/062
307/65

FOREIGN PATENT DOCUMENTS

CN    1894835 A    1/2007
CN    201122919 Y    9/2008
(Continued)

OTHER PUBLICATIONS

Thomas Guillod et al., "Protection of MV/LV Solid-State Transformers in the Distribution Grid", IECON2015-Yokohama, Nov. 9-12, 2015, total 8 pages.
(Continued)

*Primary Examiner* — Nguyen Tran
(74) *Attorney, Agent, or Firm* — WOMBLE BOND DICKINSON (US) LLP

(57) ABSTRACT

Embodiments of this application provide a power conversion circuit. The power conversion circuit includes at least one first power conversion unit connected in series to a first phase line, at least one second power conversion unit connected in series to a second phase line, at least one third power conversion unit connected in series to a third phase line, a plurality of first start circuits connected in series to the first phase line, and a plurality of second start circuits connected in series to the second phase line. Each first start circuit includes a first relay and a first resistor that are connected in parallel, and first relays in all the first start circuits are sequentially closed after the power conversion circuit is powered on, to start the power conversion circuit. Each second start circuit includes a second relay and a second resistor that are connected in parallel.

20 Claims, 8 Drawing Sheets

(56) References Cited

FOREIGN PATENT DOCUMENTS

| CN | 203800819 U | 8/2014 |
| CN | 204425516 U | 6/2015 |
| CN | 205092766 U | 3/2016 |
| CN | 206349920 U | 7/2017 |
| CN | 105119501 B | 6/2018 |
| CN | 108322036 A | 7/2018 |
| CN | 208299518 U | 12/2018 |
| CN | 107070277 B | 6/2019 |
| CN | 109600031 B | 4/2020 |
| CN | 112653335 A | 4/2021 |

OTHER PUBLICATIONS

Fen iao Cui et al.,"Study of Some Operational Degrees of Freedom for Cascaded AC-DC Converters in Solid State Transformer", 10th International Conference on Power Electronics—ECCE Asia, May 27-30, 2019, total 6 pages.

\* cited by examiner

--Prior Art--

--Prior Art--

POWER CONVERSION CIRCUIT, METHOD FOR CONTROLLING POWER CONVERSION CIRCUIT, AND TRANSFORMER

CROSS-REFERENCE TO RELATED APPLICATIONS

This application claims priority to Chinese Patent Application No. 202011443619.1, filed on Dec. 8, 2020, which is hereby incorporated by reference in its entirety.

TECHNICAL FIELD

This application relates to the field of power electronics technologies, and in particular, to a power conversion circuit, a method of controlling a power conversion circuit, and a transformer.

BACKGROUND

A solid-state transformer (SST) is a still electrical device that combines a power electronics conversion technology and an electromagnetic induction principle-based high-frequency electric energy conversion technology to convert electric energy of one power characteristic into electric energy of another power characteristic. Compared with a conventional transformer, the SST can implement flexible control over a primary current, a secondary voltage, and power.

FIG. 1 is a schematic diagram of a structure of an SST. In the SST, input of each of three phase lines A, B and C is an alternating current voltage of 10 kV. On each phase line, a resistor and a relay (which may also be referred to as a contactor) that are connected in parallel are disposed to start the SST. As shown in FIGS. 1, R1 and T1 that are connected in parallel are disposed on the phase line A, R2 and T2 that are connected in parallel are disposed on the phase line B, and R3 and T3 that are connected in parallel are disposed on the phase line C. In the SST shown in FIG. 1, all of A1, B1, C1, ..., An, Bn, and Cn (n≥1) are power converters, and are configured to implement power conversion. On the phase line A, A1, A2, ..., and An are connected in series, on the phase line B, B1, B2, ..., and Bn are connected in series, and on the phase line C, C1, C2, ..., and Cn are connected in series. For a topology of each power converter, refer to FIG. 2. Bus capacitors connected in series, namely, Ca, Cb, Cc, and Cd in FIG. 2, are disposed in each power converter.

A start process of the SST shown in FIG. 1 may be described as follows: When the SST is not powered on, T1, T2, and/or T3 are opened. When the SST is just powered on, a capacitance of a bus capacitor in the power converter is 0, and mains electricity charges the bus capacitor by using the resistors R1, R2, and R3 that are connected in parallel to T1, T2, and T3. When T1, T2, and/or T3 are not closed, the bus capacitor is charged to a voltage Vb1 because of existence of the resistors R1, R2, and R3. After T1, T2, and/or T3 are closed, a voltage Vb2 of the bus capacitor is greater than Vb1 because R1, R2, and R3 are respectively short-circuited by T1, T2, and/or T3. The phase line A is used as an example. As shown in FIG. 3, a total bus voltage when T1 is opened is less than a total bus voltage when T1 is closed. At a moment at which T1 is closed, hopping occurs in the total bus voltage, and a relatively large impact current is generated in a system at the moment at which T1 is closed. Similarly, there is a same problem for the phase line B and the phase line C.

It can be learned from the foregoing descriptions that, when the SST is started, relatively large currents flow through T1, T2, and T3 at moments at which T1, T2, and/or T3 are closed. Therefore, T1, T2, and T3 have relatively large contact power. Consequently, the T1, T2, and T3 components have large volumes and high costs, and in addition, there is a reliability risk.

SUMMARY

Embodiments of this application provide a power conversion circuit, a method of controlling (e.g., adjusting, modifying, manipulating) a power conversion circuit, and a transformer, to reduce a volume of a component in the power conversion circuit and improve system reliability.

In some embodiments (sometimes referred to as, "a first aspect"), the application provides a power conversion circuit. The power conversion circuit includes: at least one first power conversion unit connected in series to a first phase line, at least one second power conversion unit connected in series to a second phase line, and at least one third power conversion unit connected in series to a third phase line; a plurality of first start circuits, where the plurality of first start circuits are connected in series to the first phase line, each of the plurality of first start circuits includes a first relay and a first resistor, the first relay and the first resistor are connected in parallel, and first relays in all the first start circuits are sequentially closed after the power conversion circuit is powered on, to start the power conversion circuit; and a plurality of second start circuits, where the plurality of second start circuits are connected in series to the second phase line, each of the plurality of second start circuits includes a second relay and a second resistor, the second relay and the second resistor are connected in parallel, and second relays in all the second start circuits are sequentially closed after the power conversion circuit is powered on, to start the power conversion circuit.

The first phase line is used as an example. In the power conversion circuit provided in the first aspect, the first relays in the plurality of first start circuits are sequentially closed when the power conversion circuit is started. Assuming that there are n first start circuits, there are also n first relays. The $1^{st}$ closed first relay is referred to as a relay 1, the $2^{nd}$ closed first relay is referred to as a relay 2, ..., and the $n^{th}$ closed first relay is referred to as a relay n. When the relay 1 is closed, a first resistor connected in parallel to the relay 1 is short-circuited, a current on the first phase line rises from I1 to I2, and a bus capacitor voltage in the first power conversion unit rises from Vb1 to Vb2. Because a first resistor connected in parallel to the relay 2, a first resistor connected in parallel to the relay 3, ..., and a first resistor connected in parallel to the relay n have a current limiting function on the first phase line, I2 has a relatively small increment compared with I1, and therefore the relay 1 has relatively small contact power. Similarly, when the relay 2 is closed, the first resistor connected in parallel to the relay 2 is short-circuited, the current on the first phase line rises from I2 to I3, and the bus capacitor voltage in the first power conversion unit rises from Vb2 to Vb3. Because the first resistor connected in parallel to the relay 3, ..., and the first resistor connected in parallel to the relay n have a current limiting function on the first phase line, I3 has a relatively small increment compared with I2, and therefore the relay 2 has relatively small contact power .... For the relay n, a resistor with a relatively small resistance may be selected as the first resistor connected in parallel to the relay n. Therefore, a voltage of both ends of the relay n is relatively small, and even if relatively large current impact occurs when the relay n is closed, contact power of the relay n is less than contact power of a relay when a solution in the conventional technology is used.

Similarly, when the power conversion circuit provided in the first aspect is started, contact power of the plurality of second relays on the second phase line is also relatively small. Therefore, according to the power conversion circuit provided in the first aspect, the relay has relatively small contact power and a relatively small volume. In addition, when the power conversion circuit is started, because the relays on the first phase line and the second phase line are sequentially closed, a current in a system gradually rises, so that relatively large current impact in the system is avoided, thereby improving system reliability.

In some embodiments, after the power conversion circuit is powered on, in the first relays in the plurality of first start circuits, a resistance of a first resistor correspondingly connected in parallel to a first relay closed at a moment T1 is greater than or equal to a resistance of a first resistor correspondingly connected in parallel to a first relay closed at a moment T2, and the moment T1 is earlier than the moment T2; and in the second relays in the plurality of second start circuits, a resistance of a second resistor correspondingly connected in parallel to a second relay closed at a moment T3 is greater than or equal to a resistance of a second resistor correspondingly connected in parallel to a second relay closed at a moment T4, and the moment T3 is earlier than the moment T4.

In other words, when the power conversion circuit is started, a first relay connected in parallel to a first resistor with a relatively large resistance may be preferentially closed on the first phase line, and a second relay connected in parallel to a second resistor with a relatively large resistance may be preferentially closed on the second phase line.

The first phase line is still used as an example. A first resistor with a largest resistance has a largest divided voltage, a first relay connected in parallel to the first resistor is first closed, and the first relay has a largest divided voltage. However, when the first relay is closed, another first resistor on the first phase line may have a current limiting function, so that contact power of the first relay is reduced. After the first relay is closed, a first relay correspondingly connected in parallel to a first resistor with a largest resistance in remaining first resistors is closed. This can also have a function of reducing contact power. Details are not described herein again. A first relay connected in parallel to a first resistor with a smallest resistance is finally closed. Because the first relay has a smallest resistance, the first relay has a smallest divided voltage. When the first relay is closed, a voltage difference between both ends of the first relay is small, so that contact power of the first relay is not excessively large even if a large current is generated when the first relay is closed. In this embodiment of this application, the resistance of the first resistor connected in parallel to the finally closed first relay may be far less than a resistance of another first resistor, so that contact power of the first relay is further reduced.

In some embodiments, a rated voltage of the first relay closed at the moment T1 is greater than or equal to a rated voltage of the first relay closed at the moment T2, and a rated voltage of the second relay closed at the moment T3 is greater than or equal to a rated voltage of the second relay closed at the moment T4.

The foregoing selection is performed based on a rated voltage of a relay for the following reason: A first resistor correspondingly connected in parallel to a first relay closed relatively early has a relatively large resistance, and the first relay has a relatively large divided voltage, and therefore a relay with a relatively large rated voltage needs to be selected.

In addition, in the power conversion circuit provided in the first aspect, the first relays in all the first start circuits are sequentially opened to shut down the power conversion circuit, and the second relays in all the second start circuits are sequentially opened to shut down the power conversion circuit.

In some embodiments, before the power conversion circuit is powered off, in the first relays in the plurality of first start circuits, a resistance of a first resistor correspondingly connected in parallel to a first relay opened at a moment T5 is less than or equal to a resistance of a first resistor correspondingly connected in parallel to a first relay opened at a moment T6, and the moment T5 is earlier than the moment T6; and in the second relays in the plurality of second start circuits, a resistance of a second resistor correspondingly connected in parallel to a second relay opened at a moment T7 is less than or equal to a resistance of a second resistor correspondingly connected in parallel to a second relay opened at a moment T8, and the moment T7 is earlier than the moment T8.

The first phase line is used as an example. The foregoing solution may be understood as follows: A first relay correspondingly connected in parallel to a first resistor with a relatively small resistance is first opened. Similarly, the $1^{st}$ closed first relay when the power conversion circuit is started is referred to as a relay 1, the $2^{nd}$ closed first relay is referred to as a relay 2, . . . , and the $n^{th}$ closed first relay is referred to as a relay n. In addition, a first resistor connected in parallel to the relay 1 is referred to as a resistor 1, a first resistor connected in parallel to the relay 2 is referred to as a resistor 2, . . . , and a first resistor connected in parallel to the relay n is referred to as a resistor n. When the power conversion circuit is shut down, the first relays are opened in the following sequence: relay n→relay n−1→ . . . relay 2→relay 1. A reason is as follows: A resistance of the resistor n is the smallest, and therefore a voltage difference between both ends of the relay n is the smallest. When the relay n is opened, the resistor n is connected to the first phase line, and a relatively large current I3 flows through the relay n. Because the voltage difference between both ends of the relay n is the smallest, max contact rating of the relay n is relatively small. After the relay n is opened, the relay n−1 is opened. Although a voltage difference between both ends of the relay n−1 is greater than the voltage difference between both ends of the relay n, because the resistor n is connected to the first phase line, a current I4 flowing through the relay n−1 is less than the current I3, so that max contact rating of the relay n−1 is relatively small; . . . ; and when the relay 1 is opened, although a resistance of the resistor 1 is the largest and a voltage difference between both ends of the relay 1 is the largest, because the resistor 2, the resistor 3, . . . , and the resistor n are connected to the first phase line, a current flowing through the relay 1 is relatively small, so that max contact rating of the relay 1 is relatively small.

Therefore, using the foregoing solution can reduce max contact rating of the relay.

In some embodiments, the power conversion circuit provided in the first aspect may further include a plurality of third start circuits. The plurality of third start circuits are connected in series to the third phase line, each of the plurality of third start circuits includes a third relay and a third resistor, the third relay and the third resistor are connected in parallel, and third relays in all the third start circuits are sequentially closed after the power conversion circuit is powered on, to start the power conversion circuit.

In some embodiments, a start circuit is disposed on each of the three phase lines, so that setting of the three phase lines in the power conversion circuit can be relatively balanced. Resistors with equivalent resistances may also be selected in start circuits on the three phase lines.

In some embodiments, after the power conversion circuit is powered on, the third relays in all the third start circuits may be further sequentially opened to shut down the power conversion circuit.

In some embodiments, a capacitance of a bus capacitor in at least one of the at least one first power conversion unit, the at least one second power conversion unit, and the at least one third power conversion unit is not zero before the power conversion circuit is powered on.

In some embodiments, the bus capacitor in the power conversion unit may be precharged, and therefore a voltage of both ends of the bus capacitor is not zero before the power conversion circuit is started. Therefore, when the power conversion circuit is started, a current flowing through a phase line corresponding to a precharged bus capacitor may be reduced, so that contact power of a relay on the phase line is further reduced.

In some embodiments (sometimes referred to as, "a second aspect"), the application provides a method of controlling a power conversion circuit. The power conversion circuit includes a plurality of first start circuits and at least one first power conversion unit that are connected in series to a first phase line, a plurality of second start circuits and at least one second power conversion unit that are connected in series to a second phase line, and at least one third power conversion unit connected in series to a third phase line. Each of the plurality of first start circuits includes a first relay and a first resistor, the first relay and the first resistor are connected in parallel, each of the plurality of second start circuits includes a second relay and a second resistor, and the second relay and the second resistor are connected in parallel. The method includes: controlling first relays in all the first start circuits to be sequentially closed after the power conversion circuit is powered on; and controlling second relays in all the second start circuits to be sequentially closed after the power conversion circuit is powered on.

In some embodiments, a resistance of a first resistor correspondingly connected in parallel to a first relay closed at a moment T1 is greater than or equal to a resistance of a first resistor correspondingly connected in parallel to a first relay closed at a moment T2, and the moment T1 is earlier than the moment T2; and a resistance of a second resistor correspondingly connected in parallel to a second relay closed at a moment T3 is greater than or equal to a resistance of a second resistor correspondingly connected in parallel to a second relay closed at a moment T4, and the moment T3 is earlier than the moment T4.

In some embodiments, a rated voltage of the first relay closed at the moment T1 is greater than or equal to a rated voltage of the first relay closed at the moment T2, and a rated voltage of the second relay closed at the moment T3 is greater than or equal to a rated voltage of the second relay closed at the moment T4.

In some embodiments, the method further includes: controlling the first relays in all the first start circuits to be sequentially opened to shut down the power conversion circuit; and controlling the second relays in all the second start circuits to be sequentially opened.

In some embodiments, a resistance of a first resistor correspondingly connected in parallel to a first relay opened at a moment T5 is less than or equal to a resistance of a first resistor correspondingly connected in parallel to a first relay opened at a moment T6, and the moment T5 is earlier than the moment T6; and a resistance of a second resistor correspondingly connected in parallel to a second relay opened at a moment T7 is less than or equal to a resistance of a second resistor correspondingly connected in parallel to a second relay opened at a moment T8, and the moment T7 is earlier than the moment T8.

In some embodiments, the power conversion circuit may further include a plurality of third start circuits, the plurality of third start circuits are connected in series to the third phase line, each of the plurality of third start circuits includes a third relay and a third resistor, and the third relay and the third resistor are connected in parallel. Correspondingly, the method further includes: controlling third relays in all the third start circuits to be sequentially closed after the power conversion circuit is powered on.

The method further includes: controlling the third relays in all the third start circuits to be sequentially opened.

In some embodiments, a capacitance of a bus capacitor in at least one of the at least one first power conversion unit, the at least one second power conversion unit, and the at least one third power conversion unit is not zero before the power conversion circuit is powered on.

In some embodiments (sometimes referred to as, "a third aspect"), the application provides a transformer, including a controller and the power conversion circuit provided in any one of the embodiments of the first aspect. The controller is configured to control a relay in the power conversion circuit to be opened or closed.

In some embodiments, for technical effects implemented in any embodiment of the second aspect and the third aspect, refer to technical effects implemented in different design manners in the first aspect. Details are not described herein again.

DESCRIPTION OF EMBODIMENTS

To make objectives, technical solutions, and advantages of this application more clearly, the following further describes this application in detail with reference to the accompanying drawings.

Figure 4:
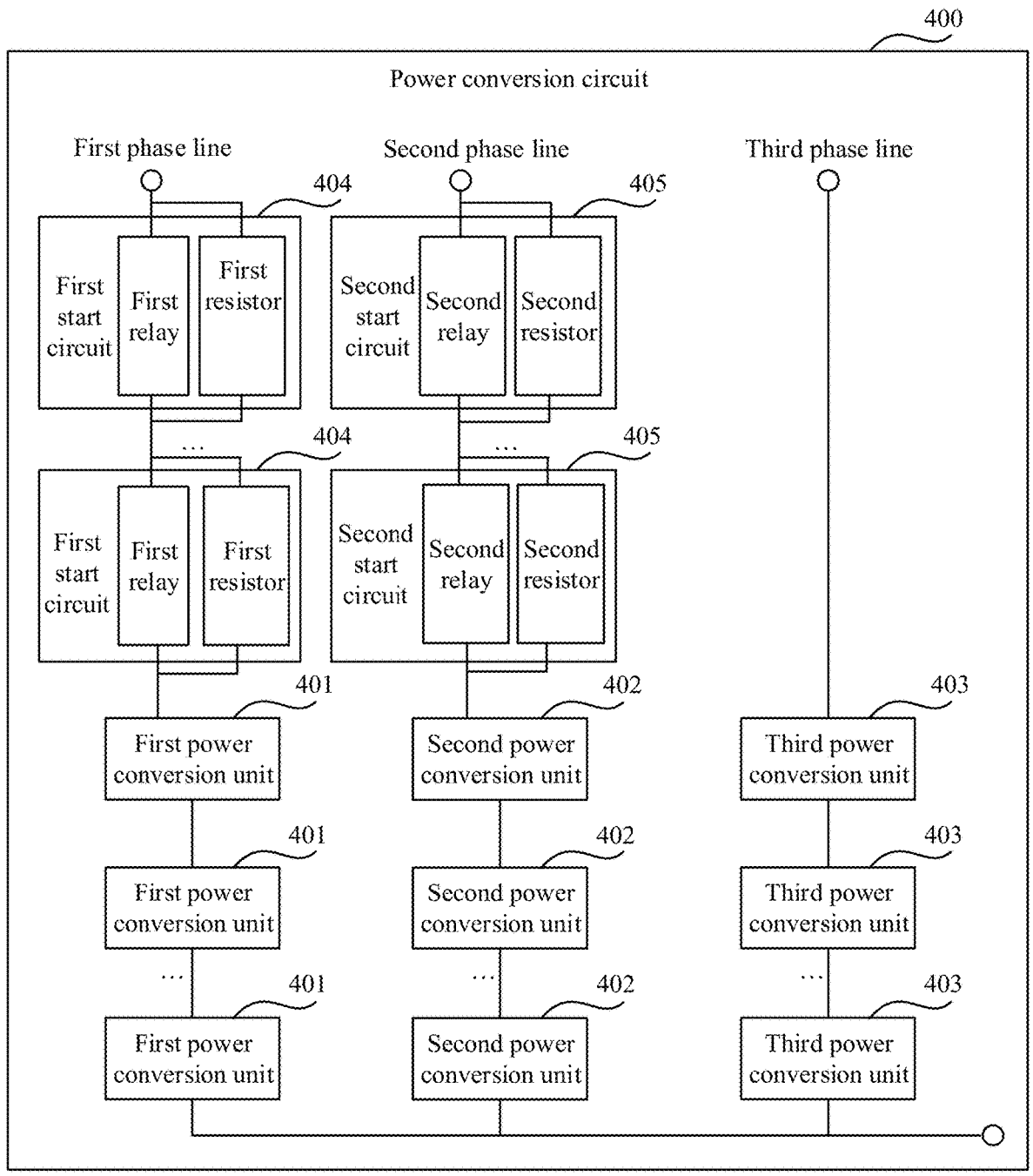
FIG. 4 is a schematic diagram of a structure of a first power conversion circuit according to an embodiment of this application.

An embodiment of this application provides a power conversion circuit. As shown in FIG. 4, a power conversion circuit 400 includes at least one first power conversion unit 401 connected in series to a first phase line, at least one second power conversion unit 402 connected in series to a second phase line, and at least one third power conversion unit 403 connected in series to a third phase line. In addition, the power conversion circuit 400 includes a plurality of first start circuits 404 and a plurality of second start circuits 405, the plurality of first start circuits 404 are connected in series to the first phase line, each first start circuit 404 includes a first relay and a first resistor, the first relay and the first resistor are connected in parallel, and first relays in all the first start circuits 404 are sequentially closed after the power conversion circuit 400 is powered on, to start the power conversion circuit 400. The plurality of second start circuits 405 are connected in series to the second phase line, each second start circuit 405 includes a second relay and a second resistor, the second relay and the second resistor are connected in parallel, and second relays in all the second start circuits 405 are sequentially closed after the power conversion circuit 400 is powered on, to start the power conversion circuit 400.

Figure 1:
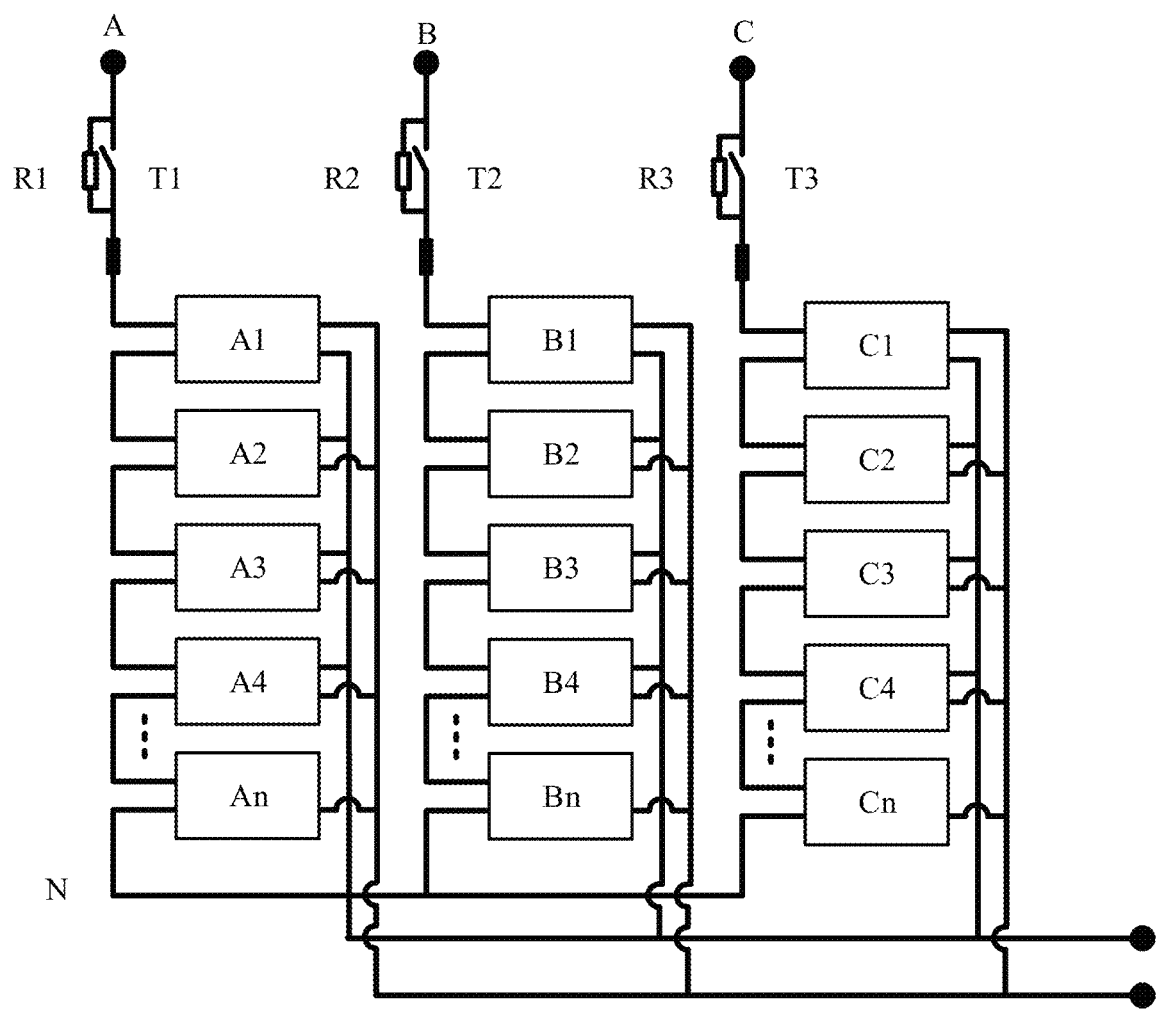
FIG. 1 is a schematic diagram of a structure of an SST according to the conventional technology.
Figure 2:
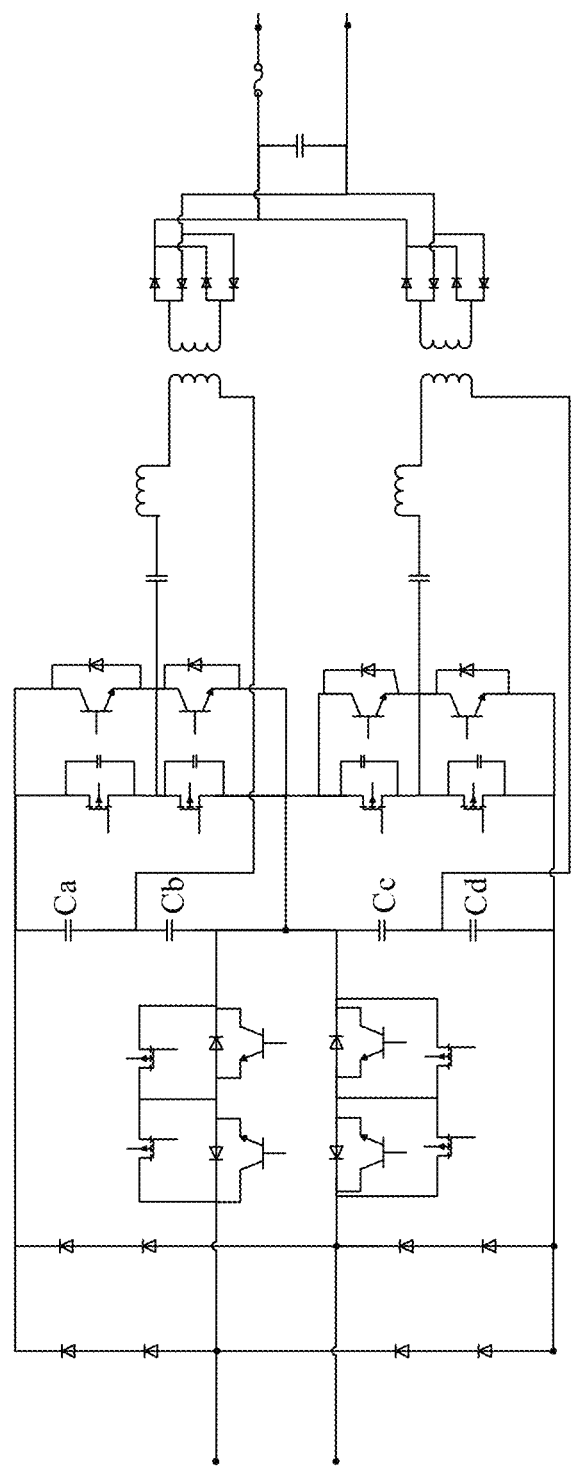
FIG. 2 is a schematic diagram of a structure of a power converter according to the conventional technology.
Figure 3:
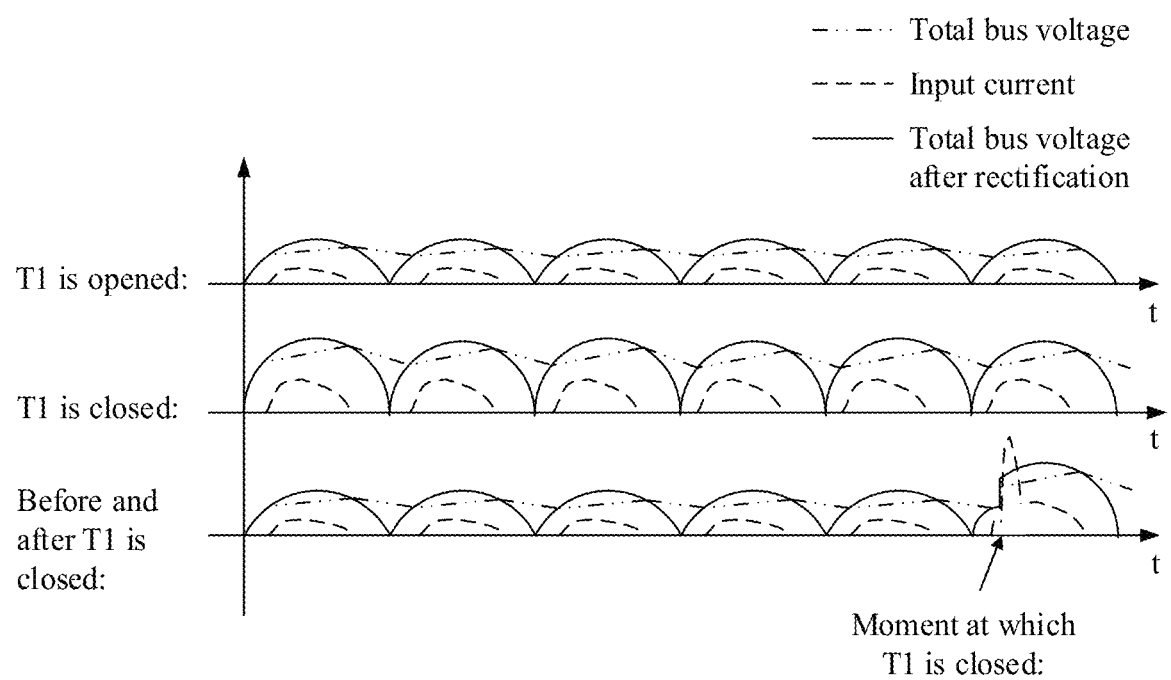
FIG. 3 is a schematic diagram of a control sequence when an SST is started according to the conventional technology.

The power conversion circuit 400 may be considered as an SST. An input voltage of the power conversion circuit 400 may be an alternating current medium voltage, an output voltage of the power conversion circuit 400 may be a direct current low voltage, and the power conversion circuit 400 is configured to implement conversion from a medium voltage alternating current to a low voltage direct current. The first power conversion unit 401, the second power conversion unit 402, and the third power conversion unit 403 are all configured to implement power conversion. For a specific structure, refer to FIG. 2. Certainly, a structure of the power conversion unit is not limited to that shown in FIG. 2. A circuit structure that can implement a power conversion function in the conventional technology is also applicable to this embodiment of this application.

In the power conversion circuit 400 shown in FIG. 4, the first phase line, the second phase line, and the third phase line are three phase lines of a three-phase alternating current. The plurality of first start circuits 404 are disposed on the first phase line, and the plurality of second start circuits 405 are disposed on the second phase line. The first start circuit 404 includes a first relay and a first resistor that are connected in parallel, and the second start circuit 405 includes a second relay and a second resistor that are connected in parallel.

The first phase line is used as an example. When the power conversion circuit 400 is started, the first relays in the plurality of first start circuits 404 are sequentially closed. Assuming that there are n first start circuits 404, there are also n first relays. The $1^{st}$ closed first relay is referred to as a relay 1, the $2^{nd}$ closed first relay is referred to as a relay 2, ..., and the $n^{th}$ closed first relay is referred to as a relay n. When the relay 1 is closed, a first resistor connected in parallel to the relay 1 is short-circuited, a current on the first phase line rises from I1 to I2, and a bus capacitor voltage in the first power conversion unit 401 rises from Vb1 to Vb2. Because a first resistor connected in parallel to the relay 2, a first resistor connected in parallel to the relay 3, ..., and a first resistor connected in parallel to the relay n have a current limiting function on the first phase line, I2 has a relatively small increment compared with I1, and therefore the relay 1 has relatively small contact power. Similarly, when the relay 2 is closed, the first resistor connected in parallel to the relay 2 is short-circuited, the current on the first phase line rises from I2 to I3, and the bus capacitor voltage in the first power conversion unit 401 rises from Vb2 to Vb3. Because the first resistor connected in parallel to the relay 3, ..., and the first resistor connected in parallel to the relay n have a current limiting function on the first phase line, I3 has a relatively small increment compared with I2, and therefore the relay 2 has relatively small contact power; ...; and for the relay n, a resistor with a relatively small resistance may be selected as the first resistor connected in parallel to the relay n. Therefore, a voltage difference between both ends of the relay n is relatively small, and even if relatively large current impact occurs when the relay n is closed, contact power of the relay n is less than contact power of a relay when a solution in the conventional technology is used.

Similarly, when the power conversion circuit 400 is started, contact power of the plurality of second relays on the second phase line is also relatively small. Therefore, according to the power conversion circuit 400 provided in this embodiment of this application, the relay has relatively small contact power and a relatively small volume. In addition, when the power conversion circuit 400 is started, because the relays on the first phase line and the second phase line are sequentially closed, a current in a system gradually rises, so that relatively large current impact in the system is avoided, thereby improving system reliability.

In some embodiments, there are a plurality of first start circuits, for example, there may be two, three, or four first start circuits, and there are a plurality of second start circuits, for example, there may be two, three, or four second start circuits. A quantity of first start circuits may be the same as or different from a quantity of second start circuits. In a possible example, there are two first start circuits and four second start circuits. In another possible example, there are three first start circuits and three second start circuits. In addition, on each phase line, there may be one or more power conversion units, and a quantity of power conversion units on each phase line may be the same as or different from a quantity of power conversion units on another phase line.

In some embodiments, a sequence of closing the plurality of first relays is: The plurality of first relays are sequentially closed to start the power conversion circuit 400. In another possible case, some of the plurality of first relays may be simultaneously closed. For example, there are four first relays on the first phase line: a relay 1, a relay 2, a relay 3, and a relay 4. In this case, the relay 1, the relay 2, the relay 3, and the relay 4 may be sequentially closed, or the relay 1 may be closed, then the relay 2 and the relay 3 may be simultaneously closed, and the relay 4 may be finally closed. For the solution in which some of the first relays are simultaneously closed, although the relay has slightly larger contact power than that in the solution in which the plurality of first relays are sequentially closed, contact power of the relay is less than contact power of a relay when the solution in the conventional technology is used. The foregoing descriptions are also applicable to a sequence of closing the second relays, and details are not described herein again.

In some embodiments, when the power conversion circuit 400 is started, a first relay connected in parallel to a first resistor with a relatively large resistance may be preferentially closed on the first phase line, and a second relay connected in parallel to a second resistor with a relatively large resistance may be preferentially closed on the second phase line. To be specific, after the power conversion circuit 400 is powered on, in the first relays in the plurality of first start circuits 404, a resistance of a first resistor correspondingly connected in parallel to a first relay closed at a moment T1 is greater than or equal to a resistance of a first resistor correspondingly connected in parallel to a first relay closed at a moment T2, and the moment T1 is earlier than the moment T2; and in the second relays in the plurality of second start circuits 405, a resistance of a second resistor correspondingly connected in parallel to a second relay closed at a moment T3 is greater than or equal to a resistance of a second resistor correspondingly connected in parallel to a second relay closed at a moment T4, and the moment T3 is earlier than the moment T4.

Using the foregoing solution can further reduce contact power of a relay and improve system reliability. The first phase line is used as an example. A first resistor with a largest resistance has a largest divided voltage, a first relay connected in parallel to the first resistor is first closed, and the first relay has a largest divided voltage. However, when the first relay is closed, another first resistor on the first phase line may have a current limiting function, so that contact power of the first relay is reduced. After the first relay is closed, a first relay correspondingly connected in parallel to a first resistor with a largest resistance in remaining first resistors is closed. This can also have a function of reducing contact power. Details are not described herein again. A first relay connected in parallel to a first resistor with a smallest resistance is finally closed. Because the first relay has a smallest resistance, the first relay has a smallest divided voltage. When the first relay is closed, a voltage difference between both ends of the first relay is small, so that contact power of the first relay is not excessively large even if a large current is generated when the first relay is closed. In this embodiment of this application, the resistance of the first resistor connected in parallel to the finally closed first relay may be far less than a resistance of another first resistor, so that contact power of the first relay is further reduced.

In some embodiments, a rated voltage of the first relay closed at the moment T1 is greater than or equal to a rated voltage of the first relay closed at the moment T2, and a rated voltage of the second relay closed at the moment T3 is greater than or equal to a rated voltage of the second relay closed at the moment T4. In other words, a first relay closed relatively early has a relatively large rated voltage. A reason is as follows: A first resistor correspondingly connected in parallel to the first relay closed relatively early has a relatively large resistance, and the first relay has a relatively large divided voltage, and therefore a relay with a relatively large rated voltage needs to be selected. Similarly, a same rule may be followed for selection based on a rated voltage of a second relay. In other words, a second relay closed relatively early has a relatively large rated voltage on the second phase line. A specific reason is not described herein again.

In addition to starting the power conversion circuit 400, the first start circuit 404 and the second start circuit 405 provided in this embodiment of this application may be configured to shut down the power conversion circuit 400. In some embodiments, the first relays in all the first start circuits 404 are sequentially opened to shut down the power conversion circuit 400, and the second relays in all the second start circuits 405 are sequentially opened to shut down the power conversion circuit 400.

It should be noted that after the first relays in the first start circuits 404 and the second relays in the second start circuits 405 are opened, because the first relay is connected in parallel to a first resistor and the second relay is connected in parallel to a second resistor, an input voltage enters the power conversion circuit 400 through the first resistor and the second resistor. Certainly, in this case, power of the power conversion circuit 400 is quite small. After the first relays and the second relays are opened, the input voltage of the power conversion circuit 400 may be cut off by using another apparatus. Because this solution of cutting off the input voltage is little associated with the solution in this embodiment of this application, this solution is not discussed in detail. In this embodiment of this application, only sequences of opening the plurality of first relays and the plurality of second relays when the power conversion circuit 400 is shut down are discussed.

When the power conversion circuit 400 is shut down, a sequence of opening the plurality of first relays is opposite to the sequence of closing the plurality of first relays, and a sequence of opening the plurality of second relays is also opposite to the sequence of closing the plurality of second relays. To be specific, in the first relays in the plurality of first start circuits 404, a resistance of a first resistor correspondingly connected in parallel to a first relay opened at a moment T5 is less than or equal to a resistance of a first resistor correspondingly connected in parallel to a first relay opened at a moment T6, and the moment T5 is earlier than the moment T6; and in the second relays in the plurality of second start circuits 405, a resistance of a second resistor correspondingly connected in parallel to a second relay opened at a moment T7 is less than or equal to a resistance of a second resistor correspondingly connected in parallel to a second relay opened at a moment T8, and the moment T7 is earlier than the moment T8.

The following describes setting of a sequence of opening the relays. The first phase line is used as an example. A first relay correspondingly connected in parallel to a first resistor with a relatively small resistance is first opened. As described above, the $1^{st}$ closed first relay when the power conversion circuit 400 is started is referred to as a relay 1, the $2^{nd}$ closed first relay is referred to as a relay 2, . . . , and the $n^{th}$ closed first relay is referred to as a relay n. In addition, a first resistor connected in parallel to the relay 1 is referred to as a resistor 1, a first resistor connected in parallel to the relay 2 is referred to as a resistor 2, . . . , and a first resistor connected in parallel to the relay n is referred to as a resistor n.

When the power conversion circuit 400 is shut down, the first relays are opened in the following sequence: relay n→relay n−1→ . . . →relay 2→relay 1. A reason is as follows: A resistance of the resistor n is the smallest, and therefore a voltage difference between both ends of the relay n is the smallest. When the relay n is opened, the resistor n is connected to the first phase line, and a relatively large current I3 flows through the relay n. Because the voltage difference between both ends of the relay n is the smallest, max contact rating of the relay n is relatively small. After the relay n is opened, the relay n−1 is opened. Although a voltage difference between both ends of the relay n−1 is greater than the voltage difference between both ends of the relay n, because the resistor n is connected to the first phase line, a current I4 flowing through the relay n−1 is less than the current I3, so that max contact rating of the relay n−1 is relatively small; . . . ; and when the relay 1 is opened, although a resistance of the resistor 1 is the largest and a voltage difference between both ends of the relay 1 is the largest, because the resistor 2, the resistor 3, . . . , and the resistor n are connected to the first phase line, a current flowing through the relay 1 is relatively small, so that max contact rating of the relay 1 is relatively small.

Similarly, when the power conversion circuit 400 is shut down, the sequence of opening the second relays is similar to the sequence of opening the first relays, in other words, a second relay correspondingly connected in parallel to a second resistor with a relatively small resistance is first opened. A specific reason is not described herein again.

In some embodiments, the sequence of opening the plurality of first relays is: The plurality of first relays are sequentially opened to shut down the power conversion circuit 400. In another possible case, some of the plurality of first relays may be simultaneously opened. For example, there are four first relays on the first phase line: a relay 1, a relay 2, a relay 3, and a relay 4. In this case, the relay 4, the relay 3, the relay 2, and the relay 1 may be sequentially opened, or the relay 4 may be opened, then the relay 3 and the relay 2 may be simultaneously opened, and the relay 1 may be finally opened. For the solution in which some of the first relays are simultaneously opened, although the relay has slightly larger max contact rating than that in the solution in which the plurality of first relays are sequentially opened, max contact rating of the relay is less than max contact rating of a relay when a solution in the conventional technology is used. The foregoing descriptions are also applicable to the sequence of opening the second relays, and details are not described herein again.

Figure 5:
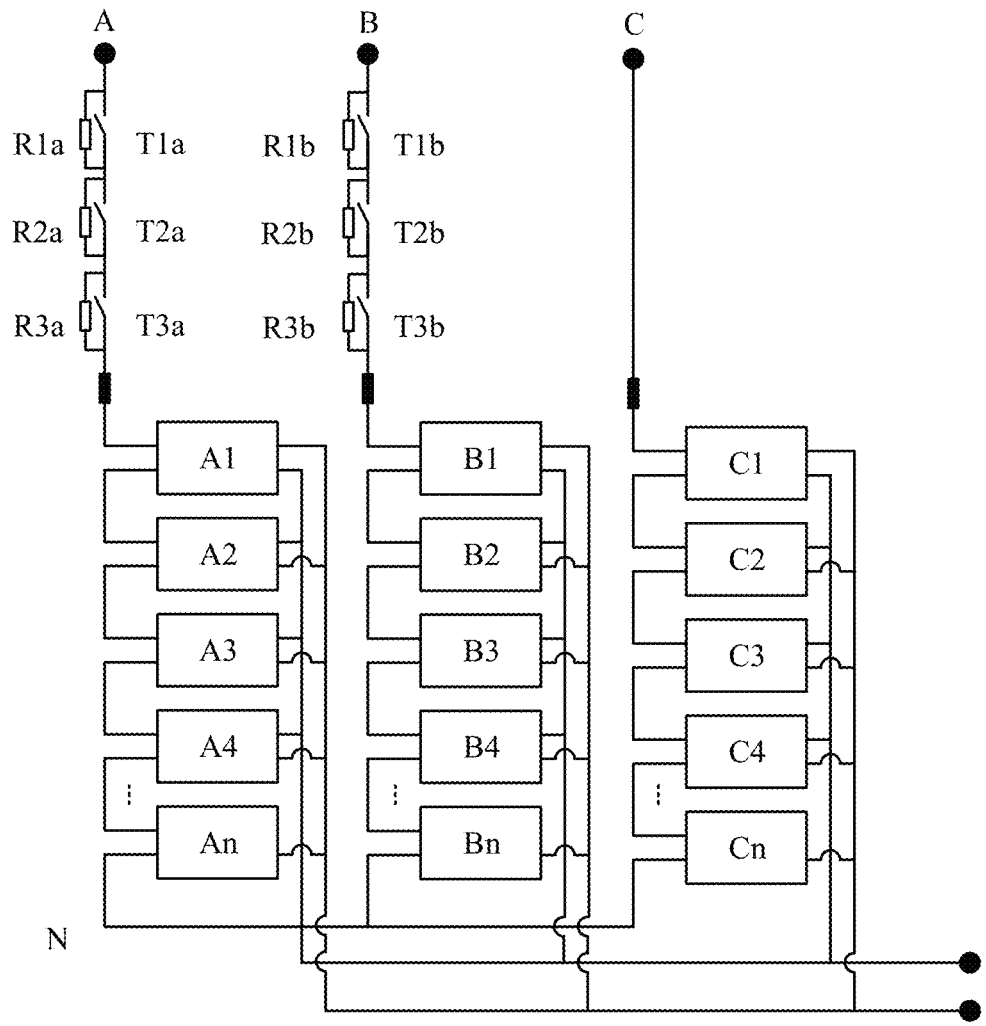
FIG. 5 is a schematic diagram of a structure of a second power conversion circuit according to an embodiment of this application.

For example, FIG. 5 shows a possible structure of the power conversion circuit 400. As shown in FIG. 5, an input end of each of a phase line A and a phase line B is connected in series to three relays (or contactors), T1$a$, T2$a$, and T3$a$ are connected in series on the phase line A, the relays are separately connected in series to three resistors R1$a$, R2$a$, and R3$a$, and the phase line B uses the same solution. Resistances of R1, R2, and R3 are set as follows: R1≥R2>R3, and rated voltage of T1≥rated voltage of T2>rated voltage of T3. When the power conversion circuit 400 is started, the relays on the phase line A are closed in the following sequence: T1$a$→T2$a$→T3$a$. When the power conversion circuit 400 is shut down, the relays on the phase line A are opened in the following sequence: T3$a$→T2$a$→T1$a$. An opening sequence of the phase line B is similar.

The phase line A is used as an example. During closing: When T1$a$, T2$a$, and T3$a$ are all opened, voltages of T1$a$, T2$a$, and T3$a$ are respectively I1*R1$a$, I1*R2$a$, and I1*R3$a$. When T1 is closed, a current rises (e.g., increases) from I1 to I2, and a bus capacitor voltage rises from Vb1 to Vb2. Because R2$a$ and R3$a$ have a current limiting function, a closing current is quite small. Because a voltage difference is large and the current is small when T1$a$ is closed, contact power is relatively small. Similarly, when T2$a$ is closed, contact power is also relatively small due to a current limiting function of R3$a$. When T3$a$ is closed, because R3$a$ is far less than R1$a$ and R2$a$, a voltage difference between both ends of T3$a$ is quite small. For T3$a$, a closing current is large and the voltage difference is small, and therefore contact power is also relatively small. Similarly, T1$a$, T2$a$, and T3$a$ are opened in the sequence of T3$a$, T2$a$, and T1$a$, and a characteristic that max contact rating is small is also met. The phase line B has a solution similar to that of the phase line A.

The power conversion circuit 400 shown in FIG. 4 may include a plurality of third start circuits. The plurality of third start circuits are connected in series to the third phase line, each of the plurality of third start circuits includes a third relay and a third resistor, the third relay and the third resistor are connected in parallel, and third relays in all the third start circuits are sequentially closed after the power conversion circuit 400 is powered on, to start the power conversion circuit 400. In this case, after the third start circuits are configured, a specific structure of the power conversion circuit 400 may be shown in FIG. 6.

In other words, start circuits may also be disposed on the third phase line, and a specific structure and function of the third start circuit are similar to those of the first start circuit and the second start circuit. For example, when the power conversion circuit 400 is started, a third relay connected in parallel to a third resistor with a relatively large resistance may be preferably closed, to reduce contact power of the third relay. A specific working principle of the third start circuit is not described in detail herein.

In some embodiments, after the power conversion circuit 400 is powered on, the third relays in all the third start circuits may be sequentially opened to shut down the power conversion circuit 400.

Similarly, when the power conversion circuit 400 is shut down, a sequence of opening the plurality of third relays is opposite to a sequence of closing the plurality of third relays when the power conversion circuit 400 is started. In other words, a third relay connected in parallel to a third resistor with a relatively small resistance is first opened.

Figure 6:
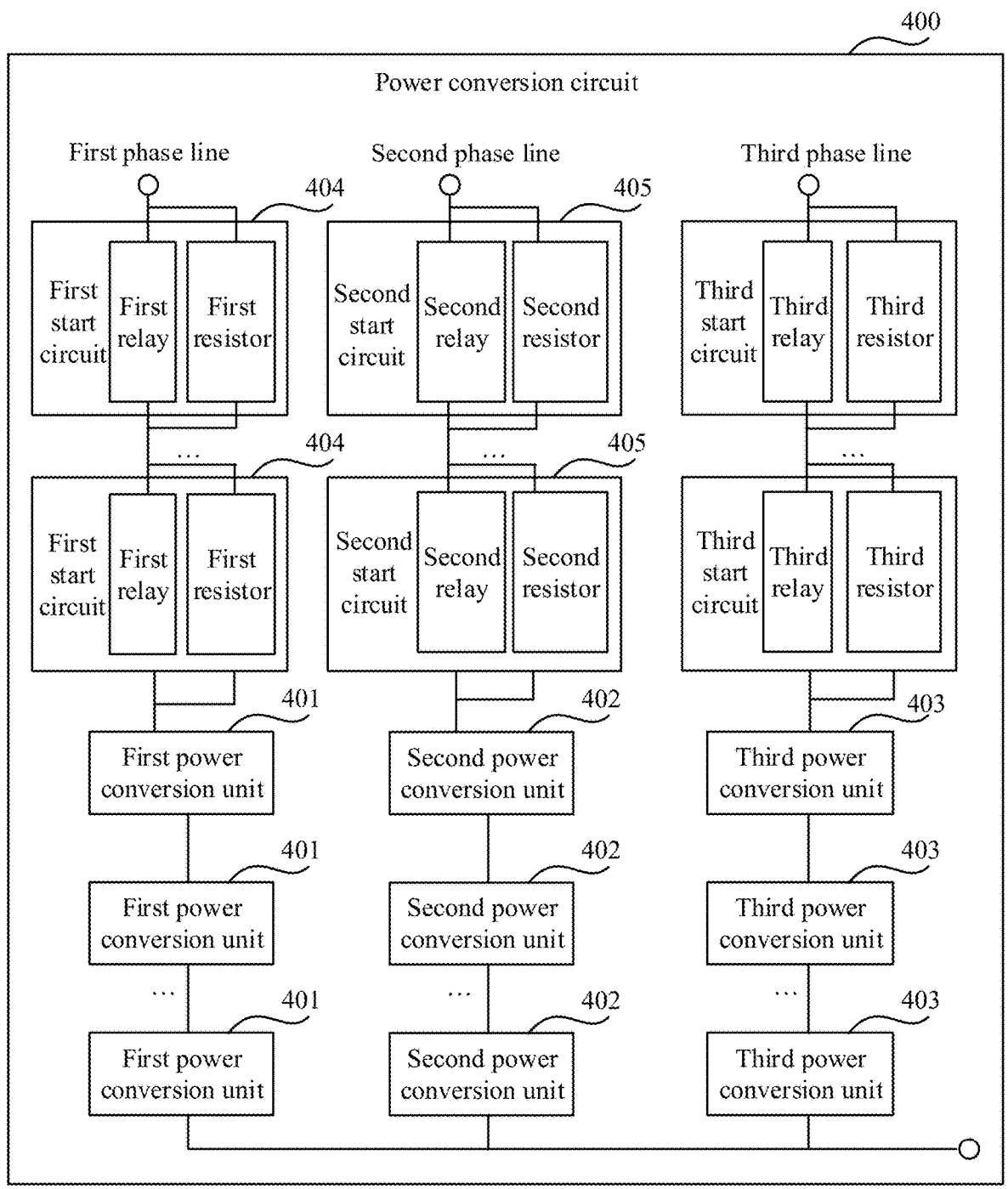
FIG. 6 is a schematic diagram of a structure of a third power conversion circuit according to an embodiment of this application.

Compared with the power conversion circuit 400 shown in FIG. 6, the power conversion circuit 400 shown in FIG. 4 is permanently connected because no start circuit is disposed on the third phase line. When the power conversion circuit 400 is started, in the power conversion circuit 400 shown in FIG. 4, a bus capacitor in the third power conversion unit is not precharged. In this case, resistors with relatively large resistances may be selected as a first resistor on the first phase line and a second resistor on the second phase line (e.g., compared with the power conversion circuit 400 shown in FIG. 6), to ensure that precharge power of the power conversion circuit 400 shown in FIG. 4 is equivalent to precharge power of the power conversion circuit 400 shown in FIG. 6.

Figure 7:
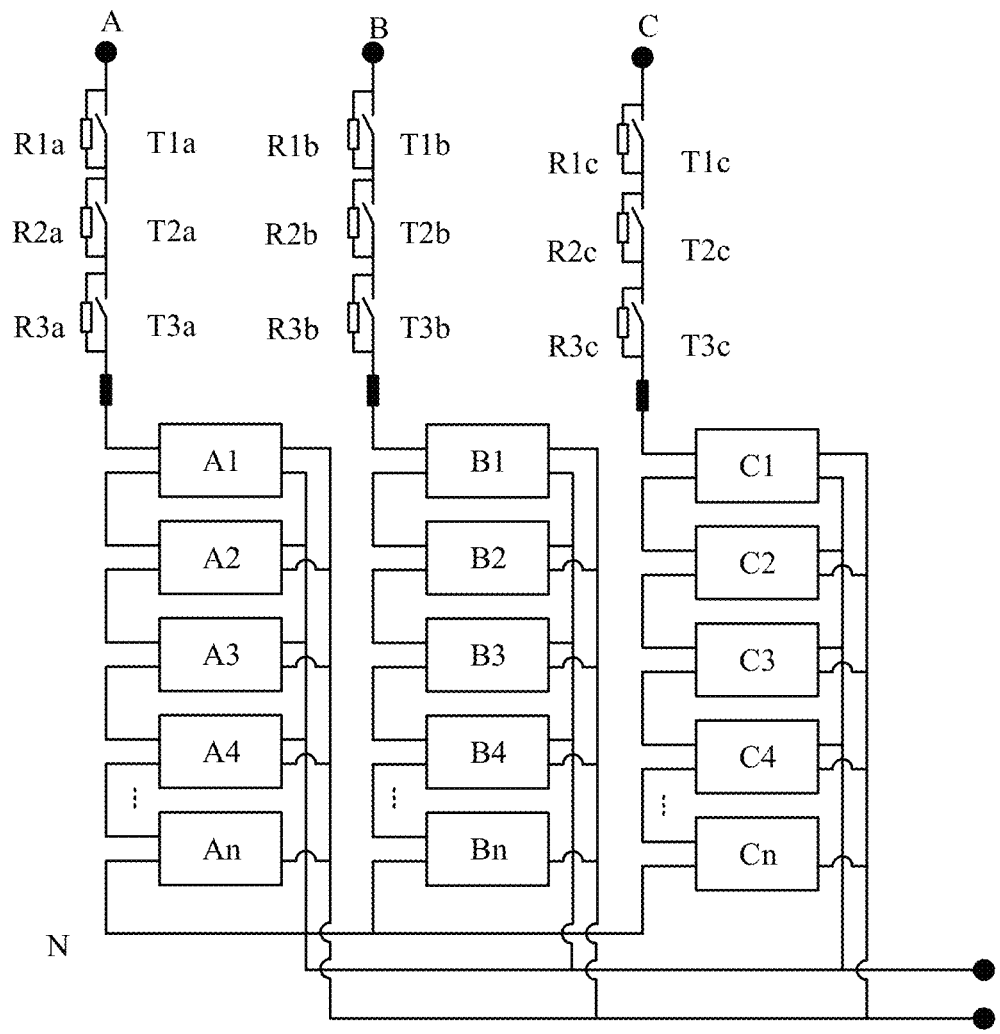
FIG. 7 is a schematic diagram of a structure of a fourth power conversion circuit according to an embodiment of this application.

For example, FIG. 7 shows a possible structure of the power conversion circuit 400. As shown in FIG. 7, each input end is connected in series to three relays (or contactors), T1$a$, T2$a$, and T3$a$ are connected in series on the phase line A, the relays are separately connected in series to three resistors R1$a$, R2$a$, and R3$a$, and a phase line B and a phase line C use the same solution. Resistances of R1, R2, and R3 are set as follows: R1≥R2>R3, and rated voltage of T1≥rated voltage of T2>rated voltage of T3. When the power conversion circuit 400 is started, the relays on the phase line A are closed in the following sequence: T1$a$→T2$a$→T3$a$. When the power conversion circuit 400 is shut down, the relays on the phase line A are opened in the following sequence: T3$a$→T2$a$→T1$a$. Opening sequences of the phase line B and the phase line C are similar to the opening sequence of the phase line A.

The phase line A is used as an example. During closing: When T1$a$, T2$a$, and T3$a$ are all opened, voltages of T1$a$, T2$a$, and T3$a$ are respectively I1*R1$a$, I1*R2$a$, and I1*R3$a$. When T1 is closed, a current rises from I1 to I2, and a bus capacitor voltage rises from Vb1 to Vb2. Because R2$a$ and R3$a$ have a current limiting function, a closing current is quite small. Because a voltage difference is large and the current is small when T1*a* is closed, contact power is relatively small. Similarly, when T2*a* is closed, contact power is also relatively small due to a current limiting function of R3*a*. When T3*a* is closed, because R3*a* is far less than R1*a* and R2*a*, a voltage difference between both ends of T3*a* is quite small. For T3*a*, a closing current is large and the voltage difference is small, and therefore contact power is also relatively small. Similarly, T1*a*, T2*a*, and T3*a* are opened in the sequence of T3*a*, T2*a*, and T1*a*, and a characteristic that max contact rating is small is also met. The phase line B and the phase line C have solutions similar to that of the phase line A.

Figure 8:
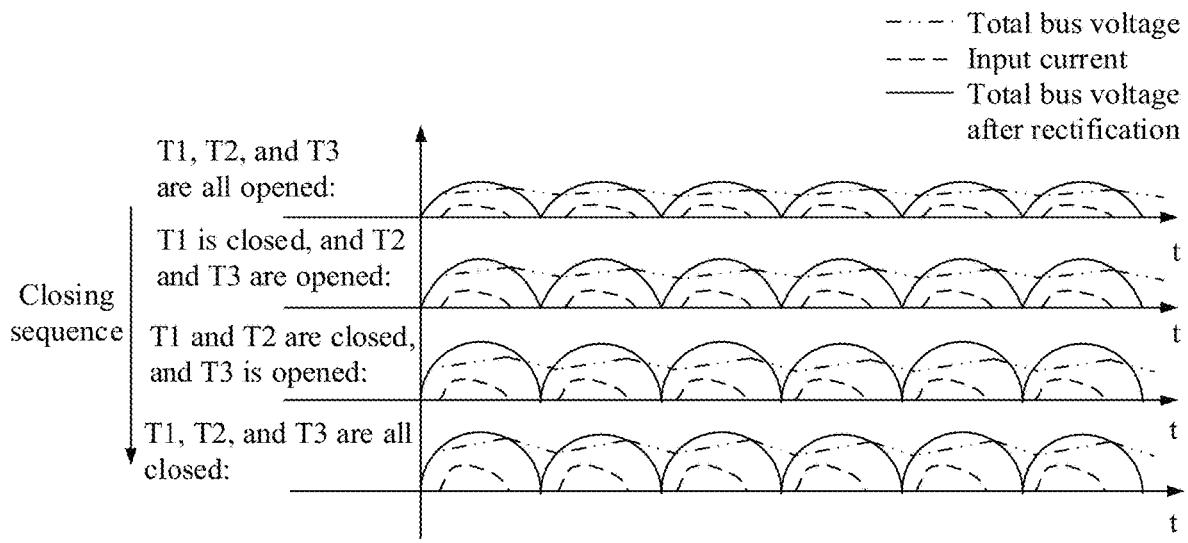
FIG. 8 is a schematic diagram of a control sequence when an SST is started according to an embodiment of this application.

FIG. 8 is a schematic diagram of a control sequence when the power conversion circuit 400 shown in FIG. 7 is used. It can be learned from FIG. 8 that, when the power conversion circuit 400 shown in FIG. 7 is used, a change in an input current is relatively small when T1, T2, and T3 are sequentially closed, so that T1, T2, and T3 are prevented from relatively large current impact when T1, T2, and T3 are closed, and contact power is relatively small.

In some embodiments, in the power conversion circuit 400 provided in this embodiment of this application, a capacitance of a bus capacitor in at least one of the at least one first power conversion unit 401, the at least one second power conversion unit 402, and the at least one third power conversion unit 403 is not zero before the power conversion circuit 400 is powered on.

In other words, the bus capacitor in the power conversion unit may be precharged, and therefore a voltage of both ends of the bus capacitor is not zero before the power conversion circuit 400 is started. The first phase line is used as an example. If a bus capacitor in the first power conversion unit is precharged, a current flowing through the first phase line may be reduced when the power conversion circuit 400 is started, so that contact power of the first relay is further reduced.

In some embodiments, all bus capacitors in the power conversion circuit 400 may be precharged, or some bus capacitors may be precharged.

In conclusion, according to the power conversion circuit 400 provided in this embodiment of this application, the first relays in the first start circuits 404 are sequentially closed, and the second relays in the second start circuits 405 are sequentially closed, so that contact power of the relay can be reduced. For a relay closed earlier, because another resistor on a phase line on which the relay is located has a current limiting function, a current flowing through the relay is relatively small, and contact power of the relay is relatively small. For a finally closed relay, a resistor with a relatively small resistance may be selected as a resistor connected in parallel to the relay, and therefore, a voltage difference between both ends of the relay is relatively small, and contact power of the relay is relatively small. In addition, when the power conversion circuit 400 is started, because relays on each phase line are sequentially closed, a current in a system gradually rises, so that relatively large current impact in the system is avoided, thereby improving system reliability.

The application further provides a method of controlling a power conversion circuit. The power conversion circuit includes a plurality of first start circuits and at least one first power conversion unit that are connected in series to a first phase line, a plurality of second start circuits and at least one second power conversion unit that are connected in series to a second phase line, and at least one third power conversion unit connected in series to a third phase line. Each of the plurality of first start circuits includes a first relay and a first resistor, the first relay and the first resistor are connected in parallel, each of the plurality of second start circuits includes a second relay and a second resistor, and the second relay and the second resistor are connected in parallel.

Figure 9:
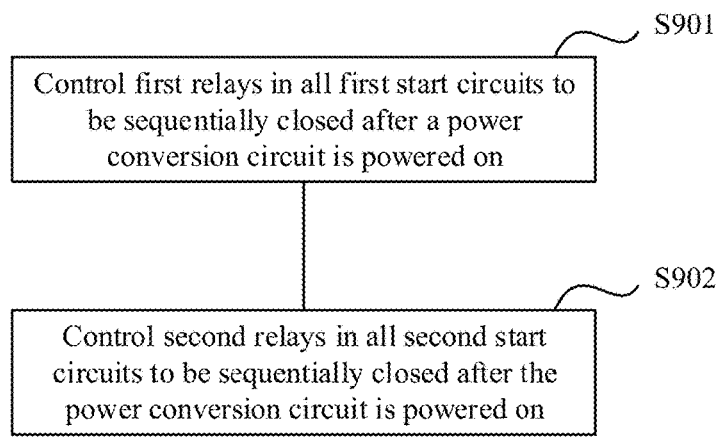
FIG. 9 is a schematic flowchart of a method of controlling a power conversion circuit according to an embodiment of this application.

As shown in FIG. 9, the method includes the following operations:

S901: Control first relays in all the first start circuits to be sequentially closed after the power conversion circuit is powered on.

S902: Control second relays in all the second start circuits to be sequentially closed after the power conversion circuit is powered on.

It should be noted that a sequence of performing S901 and S902 is not limited in this embodiment of this application. S901 may be performed before S902, S902 may be performed before S901, or S901 and S902 may be simultaneously performed.

In some embodiments, a resistance of a first resistor correspondingly connected in parallel to a first relay closed at a moment T1 is greater than or equal to a resistance of a first resistor correspondingly connected in parallel to a first relay closed at a moment T2, and the moment T1 is earlier than the moment T2; and a resistance of a second resistor correspondingly connected in parallel to a second relay closed at a moment T3 is greater than or equal to a resistance of a second resistor correspondingly connected in parallel to a second relay closed at a moment T4, and the moment T3 is earlier than the moment T4.

In some embodiments, the method includes: controlling the first relays in all the first start circuits to be sequentially opened to shut down the power conversion circuit; and controlling the second relays in all the second start circuits to be sequentially opened.

In some embodiments, a resistance of a first resistor correspondingly connected in parallel to a first relay opened at a moment T5 is less than or equal to a resistance of a first resistor correspondingly connected in parallel to a first relay opened at a moment T6, and the moment T5 is earlier than the moment T6; and a resistance of a second resistor correspondingly connected in parallel to a second relay opened at a moment T7 is less than or equal to a resistance of a second resistor correspondingly connected in parallel to a second relay opened at a moment T8, and the moment T7 is earlier than the moment T8.

In some embodiments, the power conversion circuit may include a plurality of third start circuits, the plurality of third start circuits are connected in series to the third phase line, each of the plurality of third start circuits includes a third relay and a third resistor, and the third relay and the third resistor are connected in parallel. Correspondingly, the method includes: controlling third relays in all the third start circuits to be sequentially closed after the power conversion circuit is powered on.

The method includes: controlling the third relays in all the third start circuits to be sequentially opened.

In some embodiments, shown in FIG. 9, for controlling the power conversion circuit may be considered as a method of controlling a relay in the foregoing power conversion circuit 400 to be closed or opened, to control startup or shutdown of the power conversion circuit 400. For implementations and technical effects that are not described in detail in the method shown in FIG. 9, refer to related descriptions in the foregoing power conversion circuit 400. Details are not described herein again.

Figure 10:
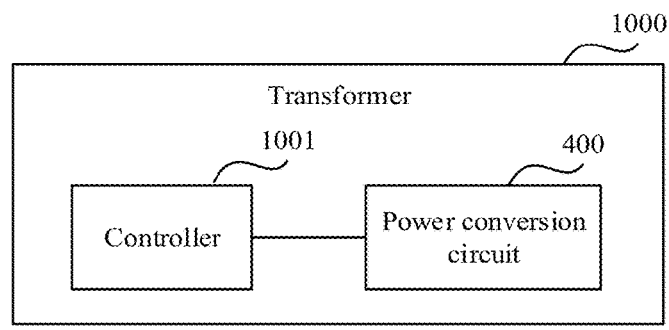
FIG. 10 is a schematic diagram of a structure of a controller according to an embodiment of this application.

In some embodiments, an embodiment of this application provides a transformer. As shown in FIG. 10, the transformer 1000 includes a controller 1001 and the foregoing power conversion circuit 400. The controller 1001 is configured to control a relay in the power conversion circuit 400 to be opened or closed.

The controller 1001 may be a central processing unit (CPU), a microcontroller unit (MCU), a system on chip (SoC), or the like. A specific form of the controller 1001 is not limited in this embodiment of this application. The controller 1001 is configured to control the relay in the power conversion circuit 400 to be closed or opened to start or shut down the power conversion circuit 400. For implementations and technical effects of the transformer 1000 that are not described in detail, refer to related descriptions in the foregoing power conversion circuit 400. Details are not described herein again.

It is clear that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A power conversion circuit, comprising:
   at least one first power conversion unit connected in series to a first phase line, at least one second power conversion unit connected in series to a second phase line;
   a plurality of first start circuits connected in series to the first phase line, wherein_each of the plurality of first start circuits comprises a first relay and a first resistor, the first relay and the first resistor are connected in parallel, and first relays in all the first start circuits are sequentially closed after the power conversion circuit is powered on, to start the power conversion circuit; and
   a plurality of second start circuits connected in series to the second phase line, wherein_each of the plurality of second start circuits comprises a second relay and a second resistor, the second relay and the second resistor are connected in parallel, and second relays in all the second start circuits are sequentially closed after the power conversion circuit is powered on, to start the power conversion circuit.

2. The circuit of claim 1, wherein after the power conversion circuit is powered on, in the first relays in the plurality of first start circuits, a resistance of the first resistor correspondingly connected in parallel to the first relay closed at a moment T1 is greater than or equal to the resistance of the first resistor correspondingly connected in parallel to the first relay closed at a moment T2, and the moment T1 is earlier than the moment T2; and in the second relays in the plurality of second start circuits, a resistance of the second resistor correspondingly connected in parallel to the second relay closed at a moment T3 is greater than or equal to the resistance of the second resistor correspondingly connected in parallel to the second relay closed at a moment T4, and the moment T3 is earlier than the moment T4.

3. The circuit of claim 1, wherein a rated voltage of the first relay closed at a moment T1 is greater than or equal to the rated voltage of the first relay closed at a moment T2, and a rated voltage of the second relay closed at a moment T3 is greater than or equal to the rated voltage of the second relay closed at a moment T4.

4. The circuit of claim 1, wherein the first relays in all the first start circuits are sequentially opened to shut down the power conversion circuit, and the second relays in all the second start circuits are sequentially opened to shut down the power conversion circuit.

5. The circuit of claim 4, wherein before the power conversion circuit is powered off, in the first relays in the plurality of first start circuits, a resistance of the first resistor correspondingly connected in parallel to the first relay opened at a moment T5 is less than or equal to the resistance of the first resistor correspondingly connected in parallel to the first relay opened at a moment T6, and the moment T5 is earlier than the moment T6; and in the second relays in the plurality of second start circuits, a resistance of the second resistor correspondingly connected in parallel to the second relay opened at a moment T7 is less than or equal to the resistance of the second resistor correspondingly connected in parallel to the second relay opened at a moment T8, and the moment T7 is earlier than the moment T8.

6. The circuit of claim 1, further comprising:
   a plurality of third start circuits connected in series to a third phase line, wherein each of the plurality of third start circuits comprises a third relay and a third resistor, the third relay and the third resistor are connected in parallel, and third relays in all the third start circuits are sequentially closed after the power conversion circuit is powered on, to start the power conversion circuit.

7. The circuit of claim 6, wherein after the power conversion circuit is powered on, the third relays in all the third start circuits are sequentially opened to shut down the power conversion circuit.

8. The circuit of claim 1, wherein a capacitance of a bus capacitor in at least one of the at least one first power conversion unit, the at least one second power conversion unit, and the at least one third power conversion unit is not zero before the power conversion circuit is powered on.

9. A method, comprising:
   controlling first relays in a plurality of first start circuits of a power conversion circuit to be sequentially closed after the power conversion circuit is powered on, wherein the power conversion circuit comprises the plurality of first start circuits and at least one first power conversion unit that are connected in series to a first phase line, a plurality of second start circuits and at least one second power conversion unit that are connected in series to a second phase line, wherein each of the plurality of first start circuits comprises a first relay and a first resistor, the first relay and the first resistor are connected in parallel, each of the plurality of second start circuits comprises a second relay and a second resistor, and the second relay and the second resistor are connected in parallel; and
   controlling second relays in all the second start circuits to be sequentially closed after the power conversion circuit is powered on.

10. The method of claim 9, wherein a resistance of the first resistor correspondingly connected in parallel to the first relay closed at a moment T1 is greater than or equal to the resistance of the first resistor correspondingly connected in parallel to the first relay closed at a moment T2, and the moment T1 is earlier than the moment T2; and a resistance of the second resistor correspondingly connected in parallel to the second relay closed at a moment T3 is greater than or equal to the resistance of the second resistor correspondingly connected in parallel to the second relay closed at a moment T4, and the moment T3 is earlier than the moment T4.

11. A transformer, comprising a controller and a power conversion circuit, wherein the controller is configured to control a relay in the power conversion circuit to be opened or closed; wherein the power conversion circuit comprises:

at least one first power conversion unit connected in series to a first phase line, at least one second power conversion unit connected in series to a second phase line;

a plurality of first start circuits connected in series to the first phase line, wherein-each of the plurality of first start circuits comprises a first relay and a first resistor, the first relay and the first resistor are connected in parallel, and first relays in all the first start circuits are sequentially closed after the power conversion circuit is powered on, to start the power conversion circuit; and a plurality of second start circuits connected in series to the second phase line, wherein_each of the plurality of second start circuits comprises a second relay and a second resistor, the second relay and the second resistor are connected in parallel, and second relays in all the second start circuits are sequentially closed after the power conversion circuit is powered on, to start the power conversion circuit.

12. The transformer of claim 11, wherein after the power conversion circuit is powered on, in the first relays in the plurality of first start circuits, a resistance of the first resistor correspondingly connected in parallel to the first relay closed at a moment T1 is greater than or equal to the resistance of the first resistor correspondingly connected in parallel to the first relay closed at a moment T2, and the moment T1 is earlier than the moment T2; and in the second relays in the plurality of second start circuits, a resistance of the second resistor correspondingly connected in parallel to the second relay closed at a moment T3 is greater than or equal to the resistance of the second resistor correspondingly connected in parallel to the second relay closed at a moment T4, and the moment T3 is earlier than the moment T4.

13. The transformer of claim 11, wherein a rated voltage of the first relay closed at a moment T1 is greater than or equal to the rated voltage of the first relay closed at a moment T2, and a rated voltage of the second relay closed at a moment T3 is greater than or equal to the rated voltage of the second relay closed at a moment T4.

14. The transformer of claim 11, wherein the first relays in all the first start circuits are sequentially opened to shut down the power conversion circuit, and the second relays in all the second start circuits are sequentially opened to shut down the power conversion circuit.

15. The transformer of claim 14, wherein before the power conversion circuit is powered off, in the first relays in the plurality of first start circuits, a resistance of the first resistor correspondingly connected in parallel to the first relay opened at a moment T5 is less than or equal to the resistance of the first resistor correspondingly connected in parallel to the first relay opened at a moment T6, and the moment T5 is earlier than the moment T6; and in the second relays in the plurality of second start circuits, a resistance of the second resistor correspondingly connected in parallel to the second relay opened at a moment T7 is less than or equal to the resistance of the second resistor correspondingly connected in parallel to the second relay opened at a moment T8, and the moment T7 is earlier than the moment T8.

16. The transformer of claim 11, further comprising:

a plurality of third start circuits connected in series to a third phase line, wherein each of the plurality of third start circuits comprises a third relay and a third resistor, the third relay and the third resistor are connected in parallel, and third relays in all the third start circuits are sequentially closed after the power conversion circuit is powered on, to start the power conversion circuit.

17. The transformer of claim 16, wherein after the power conversion circuit is powered on, the third relays in all the third start circuits are sequentially opened to shut down the power conversion circuit.

18. The transformer of claim 11, further comprising at least one third power conversion unit connected in series to a third phase line, wherein a capacitance of a bus capacitor in at least one of the at least one first power conversion unit, the at least one second power conversion unit, and the at least one third power conversion unit is not zero before the power conversion circuit is powered on.

19. The circuit of claim 1, further comprising at least one third power conversion unit connected in series to a third phase line.

20. The method of claim 9, further comprising, and at least one third power conversion unit connected in series to a third phase line.

\* \* \* \* \*